Aug. 3, 1948.

F. B. NEWELL 2,446,385

ADJUSTING ARRANGEMENT FOR PNEUMATIC
RELAYS OF THE FORCE-BALANCE TYPE
Filed May 8, 1946

INVENTOR.
Floyd B. Newell
BY

Patented Aug. 3, 1948

2,446,385

UNITED STATES PATENT OFFICE 2,446,385

ADJUSTING ARRANGEMENT FOR PNEUMATIC RELAYS OF THE FORCE-BALANCE TYPE

Floyd B. Newell, Rochester, N. Y., assignor, by mesne assignments, to the United States of America, as represented by the United States Atomic Energy Commission Application May 8, 1946, Serial No. 668,304

5 Claims. (Cl. 74—470)

1

This invention relates to an adjusting arrangement for pneumatic relays of the force balance type.

In pneumatic relays such as proportional relays and reset relays of the force balance type, provision must be made for easily and accurately adjusting the sensitivity thereof.

The main feature of the present invention is the provision of a construction which satisfies the mentioned requirements and is simple to manufacture and is reliable in operation.

Figure 2:
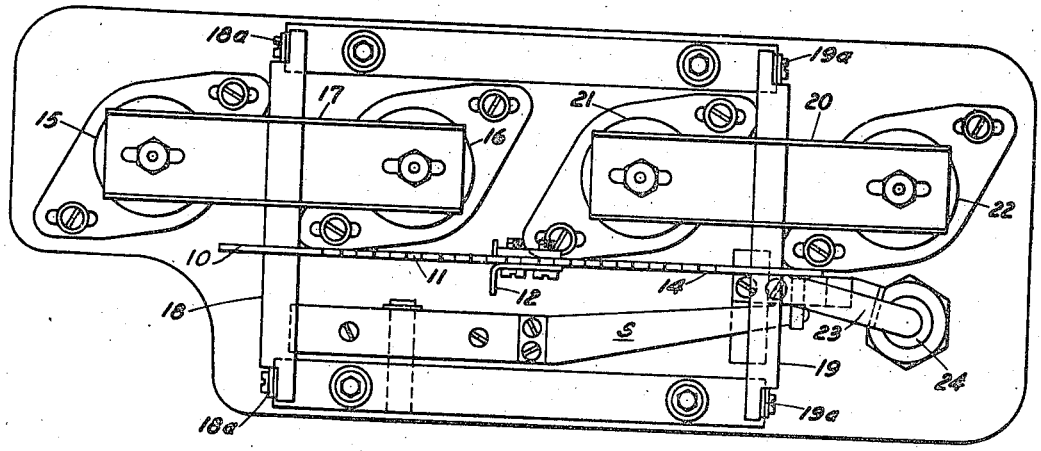
Figure 1:
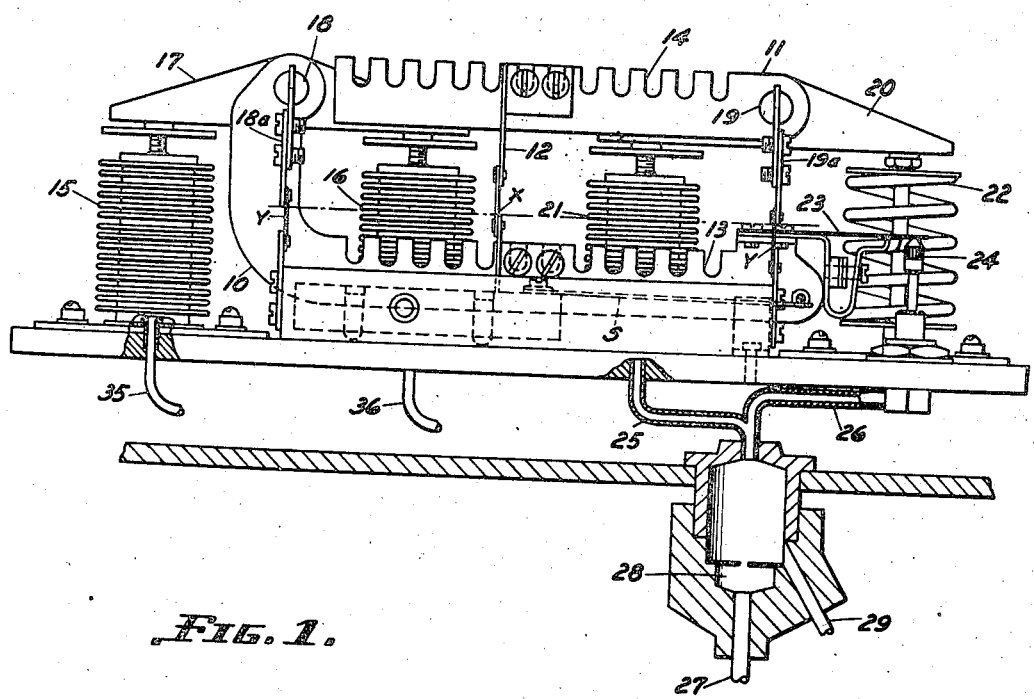

Other features of the invention will appear from the detailed description and claims when taken with the drawings in which Fig. 1 is a side elevation of a proportional relay incorporating the novel sensitivity adjusting arrangement and Fig. 2 is a plan view of this proportional relay.

Generally speaking, the proportional relay operates on the principle of the force balance and compares the torque resulting from a pair of bellows with the torque resulting from a bellows and spring combination.

Structurally, the primary assembly of the proportional relay comprises a bellows 15 and a bellows 16, both bellows being of equal size, attached at opposite sides of the midpoint of a rocker arm 17. A shaft 18 passes through an intermediate portion of the rocker arm 17 and is fixably attached thereto. The shaft 18 also passes through a bent primary lever arm 10 and is in fixed relationship with said arm 10. The shaft 18 is mounted at its ends on spring supports 18a so as to allow for partial rotation of the shaft 18 when a torque is applied thereto. The bent primary lever arm 10 has a plurality of notches 13 disposed along its upper edge and has a baffle plate 23 attached to its right end. The baffle plate 23 is positioned directly above a fixed nozzle 24, and during instrument operation, the baffle plate-nozzle spacing is determined by the motion of said arm 10.

The secondary assembly of the proportional relay comprises a straight secondary lever arm 11 having a plurality of notches 14 disposed along its upper edge, the notches 14 being in approximate vertical alignment with the notches 13 of the bent primary lever arm 10 so that a movable fulcrum strip 12 may be connected between the bent primary lever arm 10 and the straight secondary lever arm 11 using screw clamping means through the aforementioned notches 13 and 14. The central portion of the fulcrum strip 12 is made of a spring steel, in order to permit flexing during periods of lever motion. The straight lever arm 11 is secured to a shaft 19. The shaft 19 passes through an intermediate portion of another rocker arm 20 and is fixably attached hereto. At opposite ends of the rocker arm 20

2 there are attached a bellows 21 and a spring 22. The shaft 19 is mounted at its ends on spring supports 19a to allow for partial rotation of the shaft 19 when a torque is applied thereto.

The zeroing spring S supplies a force to the primary lever to correct for inequalities in the bellows forces and to permit an accurate setting of the output pressure when the pressures in bellows 15 and 16 are equal.

In normal operation a signal pressure from a differential pressure transmitter is applied to an inlet 35 of the bellows 15, and a constant but adjustable pressure is applied to an inlet 36 of the bellows 16. If the thrust produced by the bellows 15 and 16 against the rocker arm 17 is not equal, a torque will be exerted on the shaft 18 causing the bent primary lever arm 10 to exert a force on the secondary system through the fulcrum strip 12 and the secondary lever 11. Motion of said primary lever 10 also causes a change in the baffle-nozzle relationship thereby changing the loading in the bellows 21 since the inlet 25 to the bellows 21 communicates with an air line 26 which is connected to the nozzle 24. The air is supplied from a relatively constant source through a line 27 and is connected through an orifice 28 to air lines 25, 26, and 29. The air line 29 is connected with a diaphragm of a pneumatic motor positioner, not shown, and the pressure in the line 29 is proportional to the baffle-nozzle relationship, thereby causing the pneumatic motor positioner, to be controlled in accordance with the baffle-nozzle relationship. The pneumatic motor positioner controls the flow of gas in the system from which the differential pressure transmitter receives the signal which is then transmitted to the line 35 of the bellows 15 in the primary systems of the proportional relay. If the pressure in the system increases, thereby causing the pressure in the bellows 14 to become greater than the set pressure in the bellows 16, a torque results in the shaft 18 which causes the bent primary lever arm 10 to decrease the clearance between the baffle 23 and the nozzle 24. The bent primary lever arm 10 also produces a downward thrust on the secondary arm 11 through the fulcrum strip 12. The bellows 21 immediately senses the increase in back pressure resulting from the new baffle-nozzle relationship and causes a torque on the shaft 19, in the secondary assembly, which results in an upward thrust being exerted by the secondary lever arm 11 through the fulcrum strip 12 on the bent primary lever 10, thereby opposing the downward thrust of said primary arm 10 and tending to stabilize the pressure output at a value proportional to the pressure change in the primary assembly.

The increase in back pressure due to the new baffle-nozzle relationship also causes the pneumatic motor positioner to reduce the gas flow so as to correct for the original increase in pressure which caused the unbalanced condition. Sensitivity, that is the ratio of the effect resulting from a given cause, is adjustable depending upon the position at which the bent primary arm 10 and the secondary arm 11 are connected by the fulcrum strip 12. A high sensitivity results from moving the fulcrum strip 12 to the left, and conversely the sensitivity is reduced by a movement of said strip 12 to the right.

While the primary beam or lever arm 10 is shown to be bent and the secondary beam or lever arm 11 is shown to be straight, either or both of these arms can be bent. The important requirement is that the point x on the flexible part of the connecting strip 12 (connecting the two parallel arms or beams 10 and 11) be essentially in the plane passing through the point y in the flexible strips of the spring supports. The mentioned plane is indicated by the dot and dash line in Fig. 1. A further requirement is that the connecting strip 12 be adjustably connected to the lever arms or beams 10 and 11 at the notches 13 and 14 so as to change the ratio of distances between the connecting strip 12 and each pair of spring supports, which are respectively located at the right and left ends of the relay as illustrated.

Changing the ratio of distances between the connecting strip 12 and the pairs of spring supports of course changes the moment of force which the lever 11 exerts on the lever 10. The levers may not move in exact parallelism and thus there is need for the flexibility or resiliency in the connection 12 between the levers. By having the resilient portion of strip 12 lying in the same horizontal plane as the resilient portions of the mountings for shafts 18 and 19, the amount of flexing of the resilient strip 12 is minimized. In general, of course, the spring supports 18a and 19a provide frictionless mountings for the shafts 18 and 19 and eliminate any lost motion which there might otherwise be between the shafts and their mountings. This assists in eliminating hysteresis effects in the instrument, i. e., it causes the relationship between applied signal pressure and position of the moving parts to be the same, that is, to follow along the same curve on an increase in pressure as on a decrease in pressure. Thus, there results a more accurate and effective instrument wherein the position of the valve being controlled is very accurately adjusted in relation to the signal pressure. The flexibility in the strip 12 obviates any binding which might otherwise result from relative movement of levers 11 and 10 and, as pointed out above, by reason of its position relative to the flexible portions of spring supports 18a and 19a flexing thereof is minimized.

In accordance with the foregoing, I desire to point out my invention in the appended claims in the manner prescribed by statute, that is to particularly point out and distinctly claim the particular features and the combinations which constitute my invention. It is intended that the claims as written to particularly define the invention shall be interpreted to cover and include all proper equivalents thereof, that is, variations which may be made by those skilled in the art which involve only the substitution of mechanical equivalents insofar as either individual parts or combinations therefor are concerned shall be interpreted as coming within the meaning of the appended claims.

What I claim is:

1. In a relay device, a pair of shafts mounted in spaced parallel relation to each other, a pair of flexible supports for the respective ends of each shaft, a lever secured to each shaft, said levers extending from their respective shafts in superimposed parallel relation with each other, an edge of each lever having notches therein, and a member provided with a flexible portion and serving to connect said levers, said member being provided at each end thereof with means to engage a pair of superimposed notches in each of the respective levers whereby the effect of movement of one of said levers on the other can be adjusted at will.

2. In a relay device, a pair of shafts mounted in spaced parallel relation to each other, a pair of flexible supports for the respective ends of each shaft, a lever secured to each shaft, said levers extending from their respective shafts in superimposed parallel relation with each other, an edge of each lever having notches therein, one of said levers having a portion offset with respect to the plane defined by said shafts, and a member provided with a flexible portion and serving to connect said levers, said member being provided at each end thereof with means to engage a pair of superimposed notches in each of the respective levers whereby the effect of movement of one of said levers on the other can be adjusted at will.

3. In apparatus of the character described, in combination, a shaft having a lever secured thereto, the shaft having a mounting therefor and secured thereto including a resilient portion so that a torque applied for rotating it causes the resilient portion to flex, a second shaft having a lever secured thereto lying generally parallel to and overlying the first lever, said second lever having a similar mounting, and a connector having a resilient portion extending between the levers and adjustable relative thereto.

4. A structure as in claim 3 wherein the resilient portions of the lever mountings and the connector are disposed generally in a plane parallel to the levers.

5. In apparatus of the character described, in combination, a shaft having a lever secured thereto, the shaft having a mounting therefor and secured thereto including a resilient portion so that a torque applied for rotating it causes the resilient portion to flex, a second shaft having a lever secured thereto lying generally parallel to and overlying the first lever, said second lever having a similar mounting, a connector having a resilient portion extending between the levers and adjustable relative thereto, and a rocker arm connected with each shaft, each arm having at least one expansible member connected to it for actuating the rocker arms and consequently the shafts.

FLOYD B. NEWELL.

REFERENCES CITED

The following references are of record in the file of this patent:

UNITED STATES PATENTS

| Number | Name | Date |
|---|---|---|
| 344,990 | Rossney | July 6, 1886 |
| 2,298,112 | Edwards et al. | Oct. 6, 1942 |

FOREIGN PATENTS

| Number | Country | Date |
|---|---|---|
| 832,739 | France | July 4, 1938 |